United States Patent
Abdel Haq

(10) Patent No.: US 9,869,175 B2
(45) Date of Patent: Jan. 16, 2018

(54) METHOD FOR TESTING THE TIGHTNESS OF CAVITIES AND DEVICE FOR DECREASING CONVECTION AND DIFFUSION FLOW

(71) Applicant: UNTERGRUNDSPEICHER-UND GEOTECHNOLOGIE-SYSTEME GMBH, Mittenwalde (DE)

(72) Inventor: Amer Abdel Haq, Rangsdorf (DE)

(73) Assignee: UNTERGRUNDSPEICHER-UND GEOTECHNOLOGIES-SYSTEME GMBH, Mittenwalde (DE)

( * ) Notice: Subject to any disclaimer, the term of this patent is extended or adjusted under 35 U.S.C. 154(b) by 405 days.

(21) Appl. No.: 14/383,089

(22) PCT Filed: Mar. 5, 2013

(86) PCT No.: PCT/EP2013/054401
§ 371 (c)(1),
(2) Date: Sep. 4, 2014

(87) PCT Pub. No.: WO2013/131914
PCT Pub. Date: Sep. 12, 2013

(65) Prior Publication Data
US 2015/0007649 A1  Jan. 8, 2015

Related U.S. Application Data

(63) Continuation-in-part of application No. PCT/DE2012/000217, filed on Mar. 6, 2012.
(Continued)

(51) Int. Cl.
*E21B 47/10* (2012.01)
*G01M 3/28* (2006.01)
*G01M 3/22* (2006.01)

(52) U.S. Cl.
CPC ........... *E21B 47/1025* (2013.01); *G01M 3/22* (2013.01); *G01M 3/28* (2013.01); *G01M 3/2815* (2013.01)

(58) Field of Classification Search
CPC ........ G01M 3/00; G01M 3/02; E21B 47/1025
See application file for complete search history.

(56) References Cited

FOREIGN PATENT DOCUMENTS

DE  4226613  *  2/1994

OTHER PUBLICATIONS

F. Crotogino: „SMRI Reference for External Well Mechanical Integrity Testing / Performance, Date Evaluation and Assessment, 1995.
(Continued)

*Primary Examiner* — David M Gray
*Assistant Examiner* — Andrew V Do
(74) *Attorney, Agent, or Firm* — Maschoff Brennan

(57) ABSTRACT

The present invention relates to a method for testing the tightness of cavities, which are already filled with a stored gas, by charging the with a test gas. At least the following steps are provided: overlayering the stored gas situated in the cavity with a test gas of a predefined amount, in such a manner that a barrier layer forms between the stored gas and the test gas, wherein the test gas has a lower density than the stored gas, releasing the test gas after a predetermined time, and balancing the amount of the test gas. A further aspect is providing a device for decreasing the convection and diffusion flow between a stored gas situated in a cavity and a test gas.

6 Claims, 7 Drawing Sheets

Related U.S. Application Data

(60) Provisional application No. 61/607,082, filed on Mar. 6, 2012.

(56) References Cited

OTHER PUBLICATIONS

Amer Abdel Hag, UGS GmbH et al.—SMRI Technical Conference—Galveston/Texas—2011.
Amer Abdel Hag, UGS GmbH et al. ,,Appropriateness of Tracer-Gas-Mixture . . . , SMRI Spring 2011 Technical Conference, Apr. 17-20, 2011, Galveston, Texas, USA.

* cited by examiner

METHOD FOR TESTING THE TIGHTNESS OF CAVITIES AND DEVICE FOR DECREASING CONVECTION AND DIFFUSION FLOW

CROSS-REFERENCE TO A RELATED APPLICATION

This application is a National Phase Patent Application of International Patent Application Number PCT/EP2013/054401, filed on Mar. 6, 2013, which claims priority of International Patent Application Number PCT/DE2012/000217, filed on Mar. 6, 2012 and of U.S. Patent Application No. 61/607,082, Mar. 6, 2012.

BACKGROUND

The invention relates in particular to a method for testing the tightness of cavities by charging the cavity with a test gas.

In order to store natural gas or other technical gases in a larger scale, as for instance hydrogen or carbon dioxide for disposal, it is known to store the gas in underground located cavities, for instance in caverns mined of natural brine, aquifers or in other artificially created underground formations under pressure. These artificially created geological formations are pressure-tight after detailed examination and change their pressure-tight properties only in geological time periods. In order to be able to store gases in these cavities it is necessary to provide an access to the cavities by means of an access hole. This access hole consists of the hole itself and a piping, which forms a pipe shoe at the head of the cavity. The pipe shoe forms the transfer from the cavity to the artificially created access. It is a well-known technology to permanently seal such access holes.

In the following, the term "cavity" is to be understood as caverns, but also aquifers, created by human or naturally developed. Also if aquifers or porous rock layers are no cavities in the general linguistic usage, they still form underground and gas tight volumina. Such underground gas tight volumes are cavities according to the teachings of this patent application.

When creating the access hole to the cavity the cavity is in general filled with water or with natural brine. In order to test the tightness of the created access, the volume of the access, thus the piped access hole is charged with a test gas and the pressure is measured at the access after a predefined time, for instance 72 hours. If the pressure has changed only insignificantly, one can assume a tightness. A reason for the decrease of the pressure, which cannot be assigned to a missing tightness, is for instance the dissolving of the test gas in existing water or the natural brine still present in the cavity.

After the access has been finished and the tightness thereof is documented the cavity is emptied from the natural brine by a simultaneous filling with stored gas. Since the store cavities have a very large volume, the disposal of the water situated therein in case of closed cavities or the displacement of water in aquifers, thus porous rock layers, sometimes lasts multiple months. Once the cavity has reached an operation status, the cavity remains in this status until its closedown due to whatever reason. Since the properties of the cavities change only in geological time periods the operational suitability in human time periods depends only on the properties of the access hole. In order to document the suitability of an access hole provided for long-term operation subsequently within the frame of a routine investigation it would be thus necessary to document the tightness of the access hole itself. Furthermore, it is necessary to document in case of a planned pressure increase of the store cavity the access hole for its tightness in respect to the higher operational pressure of the cavity. A pressure measurement of a filled cavern conducted via time in acceptable time periods is however not possible due to the very large volumes of the gas storage. Artificially created caverns in geological salt formations are located in a depth of 300 m to 2500 m with a suitable height of up to 800 m and a diameter up to 250 m. Aquifer storages can have an even larger volume. Such large volumes do form in fact a Barostat. If stored gas escapes from these cavities in an already not any longer acceptable amount, the pressure changes almost imperceptibly in these very large cavities. It would be in principle possible for testing the tightness to detect a very small pressure drop over a longer time period. A pressure drop detected in this manner could, however, also be created by negligible temperature changes within the cavity via the longer observation period such that the pressure measurement is only a limited instrument for testing tightness.

An emptying of the cavity and filling with water or natural brine in order to document the tightness of the access hole as done when creating the access hole is almost not possible due to economic reasons. This is because the stored gas and the cushion gas existing in the dead volume has to be removed from the cavity and the cavity would have to be filled with water or natural brine. Such a process can last multiple months during which no gas can be stored. The disposal of the water after carrying out the measurement would be again a process lasting multiple months.

SUMMARY

An object of the invention is to provide a method for testing the tightness of cavities which can be carried out in the operational status of the cavity, thus in the status filled with stored gas.

According to an exemplary embodiment of the invention, a method with the following steps is suggested:
Overlayering the stored gas situated in the cavity with a test gas of a predefined amount such that a barrier layer forms between the stored gas and the test gas,
Releasing the test gas after a predefined time and
Balancing the amount of test gas.

In contrast to measuring the pressure over time of a volume being small in respect to the volume of the storage in the dimension of the access hole up to the pipe shoe, namely in the double digit cubic meter range, it is suggested according to the invention to measure not exclusively the pressure in the cavity over an observation period for documenting the tightness, but also to drain the test gas overlayering the stored gas again at the end of an observation period and to establish a balance. If test gas is missing, then a missing tightness is to be assumed. If the test gas is completely received back, then the tightness of the access hole is to be assumed.

The invention uses the knowledge that the cavity changes its tightness properties only in geological time periods. The tightness of the cavity is thus assumed. The only location which is possible for a pressure drop is thus the area of the access hole. Should the access hole be responsible for the gas loss, then the missing tightness can cause a gas loss in other geological layers, in neighboring cavities or in rock folds. A gas loss into the free atmosphere cannot necessarily be assumed when determining the decrease of tightness of an access hole.

For implementation of the measurement the test gas, which should be a different gas than the stored gas and should preferably have a lower density, so that it swims on the stored gas layer, is pressed slowly into the access hole, such that a stable barrier layer forms between the stored gas and the test gas. Since the volume of the access hole is known from the first measurement when creating the access hole, so much test gas is exactly pressed into the access hole such that the barrier layer is formed between stored gas and test gas at the hole base or at the head of the cavity, when finishing the charging of the cavity with stored gas. The thus obtained gas layering is left alone over a predefined time period in the range of 10 hours up to 100 hours and is drained after expiration of the rest period from the access hole. When draining the test gas an amount balance is established. For this reason the amount of gas removal is exactly recorded and the composition of the removed gas is exactly determined for instance in a bypass to the removal point. The gas analysis can be conducted by sensors projecting into the gas removal channel but also by sensors in a bypass to the removal piping.

When removing the test gas the determination of the barrier layer is important, thus the time point during the removal of the test gas, when the test gas is completely removed from the access hole in case of an ideal barrier layer formation. The analysis of the test gas during drainage and the determination of the arrival of the barrier layer migrating during drainage of the test gas at the removal point is thus an important part of the complete method. This time point is typically reached if the quantitative analysis of the removed gas has a sudden edge, the amount or the concentration of the test gas starts to decrease. The more stable the barrier layer between stored gas and test gas is formed the sharper the transition of test gas to stored gas is detectable in the analytics. The gas amount determined up to this time point from pressure, temperature, flow and concentration of the removed test gas allows a conclusion about the tightness of the access hole. If less test gas is get back as originally was layered over the stored gas then this is a sign for gas loss and thus a sign for the missing tightness. In contrast if the test gas is get back completely or with an expectable loss due to mixture with the stored gas when the access hole is tight.

In the rest period of the test gas it is important that the barrier layer between the test gas and the stored gas remains as stable as possible. The barrier layer is disturbed by diffusion flow and by convection flow. Especially the convection flow can create convection rollers due to low temperature differences, by which the test gas is absorbed in the very large volume of the stored gas and thereby disturbs the measurement of the tightness as an artifact. The test gas escaped into the stored gas would be missed in the mass balance established at the end of a process and a missing tightness is simulated, which is not present at all. A cause for a temperature difference between test gas and stored gas is for instance the temperature gradient within the earth crust. Thus the use of a devise for reducing convection and diffusion flow between stored gas and test gas is preferred. Such a device can be a convection barrier. Depending on the character of the barrier the convection can be prevented more or less.

This is a mechanical element for containing the mixing of both gases caused by convection and diffusion. The device disturbs acutely the present geometry of the hole in the mixing zone, but has simultaneously no influence onto the flow optimized properties of the hole. Under these technical properties the test gas can be pumped without hinderance into the hole and can be simultaneously chemically overlaid by the stored gas such that a mass balance of the test gas can be determined over the test period.

A first possibility for an convection barrier is a device for reducing convection and diffusion flow with an inflatable bellows, which fits into the diameter of the hole base and blocks the stored gas layer from the above arranged test gas layer. So that no pressure loss is created over the bellows, a membrane or a sponge is provided in the bellows, which connects the two gas layers to each other. This sponge can have an only very small diameter of a few centimeters or also have an extensive area in the range of multiple square meters. Important for the device for reducing the convection is the exact location at the barrier layer between stored gas and test gas which can be calculated.

A second possibility for a convection barrier is a device for reducing convection and diffusion flow, which provides a layer unit for insertion into an access hole of the cavity with at least two layers of the different porosity which are successive along an extension axis. When testing the tightness (or more exact: denseness) of a cavity filled with stored gas the layer unit blocks a stored gas layer from a test gas layer and allows thereby still simultaneously that the two gas layers are connected to each other (fluid optimized) via the layers of the layer unit such that gas can flow via the layers through the layer unit.

A layer comprises preferably a sponge-like material. For this reason the material of the layer can be for instance foamed. Thereby such a layer comprises a comparatively high porosity and thus gas permeability. In an embodiment the sponge-like material is a metal, preferably an aluminum foam. As an alternative the production from a ceramic material or a plastic material, as for instance PVC is possible.

In a preferred embodiment layers of a first type and layers of a second type alternate along the extension axis. In case of such a multilayered construction of a layer unit it has been shown to be in particular preferred to provide a layer of a first type with a porosity as low as possible or design non-porously such that said layer is non permeable for gas, in particular for the stored or test gas, as much as possible, and to provide the other layer of the second type with a porosity as high as possible and to design for instance sponge-like. Preferably at least two layers of the second type of a porous material with a pore density of less than 8 ppi (pores per inch) preferably between 10 and 30 ppi are used and arranged sandwich-like between two end layers of a non-porous material. Thereby the two layers of the second type of the porous material are separated from each other by an intermediate layer of a non-porous material.

In such an embodiment the singular layers of the second type of porous material can be constructed identical and can have for instance the same dimension and in particular the same thickness (as extension of the respective layer along the extension axis). Likewise the layers of non-porous material can be constructed identically. In general also other variants are conceivable, in which the singular porous layers have different pore densities and also different thicknesses. Hereby the influence on the convection and diffusion flow can be specifically influenced with a layer unit, whereby in an identical construction of the singular layers for obtaining the layer unit same parts can be used and thus costs can be reduced.

The layer unit can also be constructed such that the number of layers can be changed before insertion into an access hole. The number of layers is thus here variable adjustable and depending on the application—if necessary or required—adaptable.

For example three to ten layers (of a first type) of a porous material are arranged along the extension axis, which are in each case among each other spatially separated from each other by an intermediate layer (of a second type) of a non-porous material. At an end of the layer unit disposed along the extension axis a final layer of a non-porous material is here preferably provided, which defines the upper or lower side of the layer unit.

A layer of the first type, which is non-porous and as far as possible in an ideal case completely impermeable for gas, has in an embodiment at least one opening through which the gas can flow. Alternatively, it is conceivable instead of a layer of a material, which is impermeable for gas, to superimpose a layer with lower porosity on a layer with higher porosity or to allow a targeted flow of gas at a layer of a material almost impermeable for gas by providing a porous area at at least one location of this layer.

In a particular preferred embodiment in which the layers of the first type are made of a non-porous material, which is almost impermeable for gas, as for example rubber, and each one of these layers are arranged between two layers of the second type with predetermined porosity, an opening of a layer of the first type is offset to an opening of a second layer of the first type following hereupon along the extension axis. In this way, gas cannot flow parallel to the extension axis though both openings, since they are not aligned to each other. Rather, a gas has to flow between the openings if possible across to the extension axis through a porous layer of the second type, which is arranged between the two layers of the first type. Hereby, a gas covers the longer way through the layer unit, whereby the convection and diffusion processes are effectively disturbed and possible mixing processes last clearly longer. This facilitates when testing tightness the determination of the barrier layer between test gas and stored gas tremendously.

A shift of two openings is obtained hereby in that the two (preferably identical) layers of the first type are arranged towards each other in a distorted manner in respect to the extension axis, for example, by about more than 45°, preferably about 180°. If each layer of the first type comprises only exactly one opening with a radial distance to the extension axis being as large as possible and if the two layers of the first type are distorted towards each other about 180° about the extension axis, the gas has to cover a flow path as large as possible between the two openings. Hereby, the singular layers are preferably formed by single discs, which are arranged along the extension axis sandwich-like one after the other or on top of each other. In an embodiment these discs have a circular area.

The layer unit can comprise a (flexible) jacket, which surrounds the layers and is designed and provided to rest in a sealing manner against an internal wall of the access hole when inserting the layer unit into an access hole of a cavity such that gas cannot flow between the inner wall and the jacket passing the layer unit. Such a jacket guarantees thus that mixing processes between a stored gas and a test gas and possible gas flows occur only via the layers of the layer unit and not between the (pipe) inner wall and the layer unit.

Such a jacket can, for instance, be made of a plastic material, such as PVC or of rubber. Such a jacket can also define an inflatable bellows in order to push the jacket after insertion of the layer unit in a sealing manner against the inner wall of the access hole.

In general, it is of course conceivable to provide within a bellows of a convection barrier or a device for reducing convection and diffusion flow also layers of different porosity, for instance a porous layer, which is made of a sponge and a layer, which is made of a material of lower porosity or a non-porous material. Accordingly, features of a previously mentioned first possibility for a convection barrier can be readily combined with the following mentioned features of a second possibility for a convection barrier.

Since the profile of the access hole is known it is preferred if during charging with test gas and later during removal of the test gas the test gas is supplied with a predefined velocity. Thereby, a control of the amount of the charging with test gas per time unit is provided, which provides a constant velocity of the migration of the barrier layer between the stored gas and test gas. The constant migration velocity of the barrier helps to keep the barrier layer stable what is necessary for the correct mass balance of the test gas between charging and removal.

In particular, light gases are suitable as test gases for conducting the method, which tend due to their low density to build up barrier layers with other gases and to swim on the different gas layers. Helium (He) is in particular suitable for this purpose. Isotope-marked Helium is also suitable for an easier analysis and for separation from Helium naturally occurring in natural gas. When measuring store gas cavities for natural gas (Methane, $CH_4$) which has by itself a low density due to its low molecular weight of 16 g/mol, also Hydrogen ($H_2$) is usable. In order to facilitate the analytics also Deuterium ($D_2$), heavy Hydrogen or Tritium ($T_2$), super heavy Hydrogen, would also be usable. Deuterium and Tritium are de facto not present in natural gas as admixture such that by using these gases the falsification of the mass balance by natural gas admixtures in the stored gas would be reduced. Other light gases, as for instance Boran or Ammonia would be usable due to their density, but due to their high chemical reactivity these gases are less suitable for the use as test gas.

When using Helium as test gas it is of an advantage to catch the Helium by compressing and catching the test gas for its purification when conducting the method.

BRIEF DESCRIPTION OF THE DRAWINGS

The invention will be explained in more detail by means of the following Figures.

DETAILED DESCRIPTION

Figure 1:
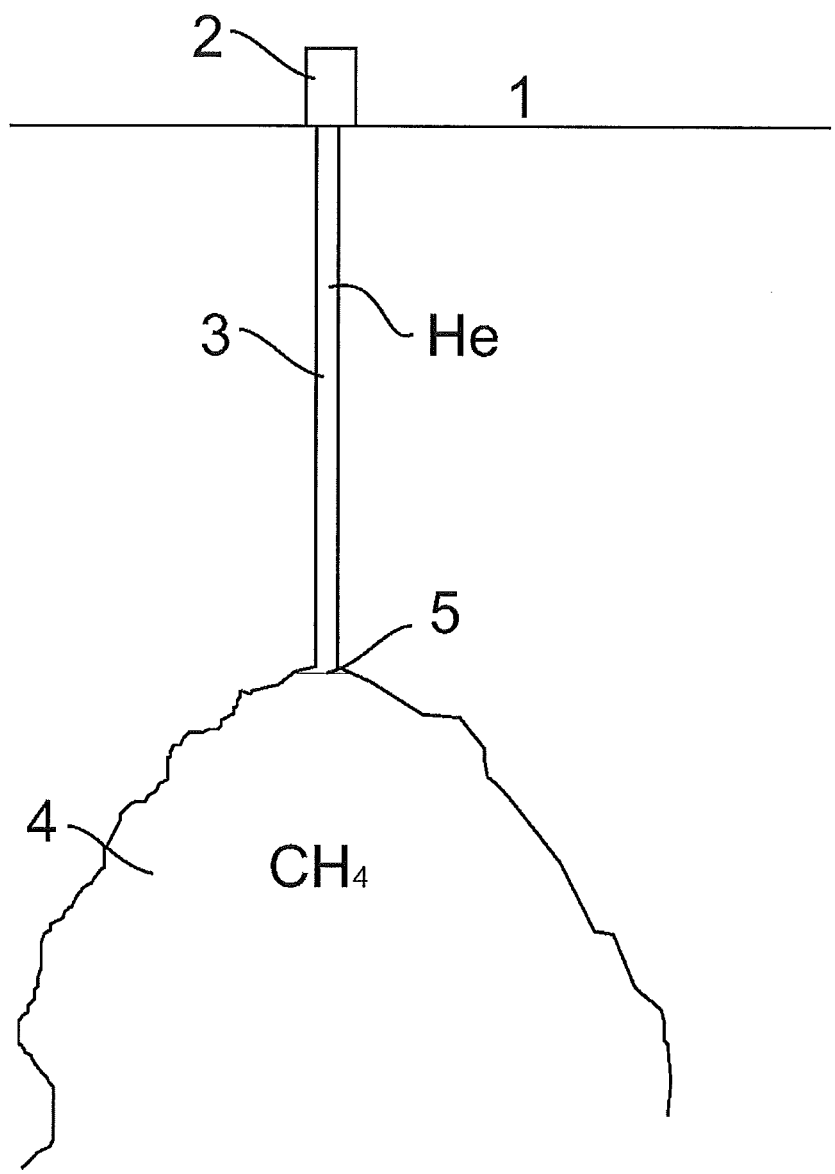
FIG. 1 shows a cross section of a storage cavity with access hole.

In FIG. 1 a sketch of a cross section of a cavity with access hole is illustrated. On the earth surface 1 a termination present there and access 2 to an access hole 3 to a cavity is illustrated. At the lower end of the access hole, the cavity 4 is located, which is filled with natural gas (CH4) when operated. For conducting the method for instance Helium (He) is pressed into the access hole 3 until a barrier layer 5 forms between the stored gas—here natural gas (CH4)—and the Helium used a test gas at the head of the cavity. This barrier layer is rested for a time period between 10 and 100 hours and after expiration of this time the Helium is drained again through the access hole 3. When draining temperature, pressure, flow-through and concentration of the test gas is determined and based thereon the amount of test gas is determined, which was again removed. By balancing the charged amount with Helium and the amount of Helium gained back, which is used here for instance as test gas, the tightness of the access hole is concluded.

Figure 2:
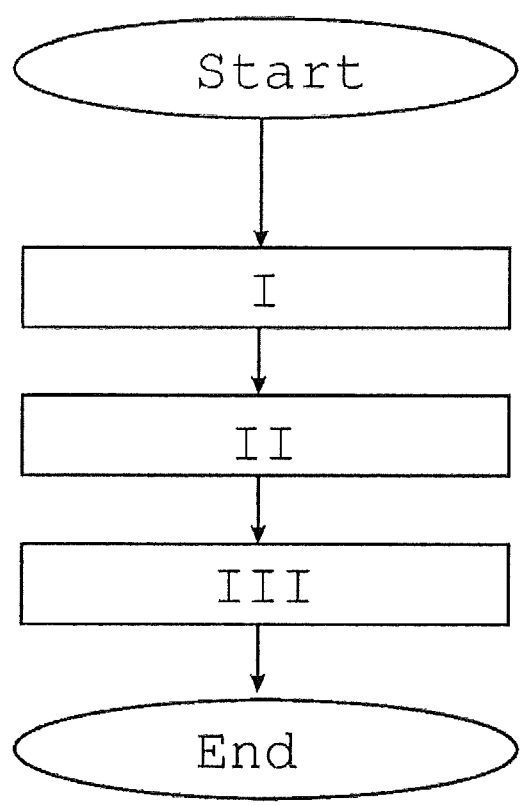
FIG. 2 shows a flow diagram of the method according to the invention.

In FIG. 2 a flow diagram of the method according to the invention is illustrated. Beginning at the start, Helium is pressed into the access hole 3 accordingly in a step I, whereby the volume of the access hole is exactly known. Subsequently, step II follows in which after a predefined time between step I and II the test gas is again drained from the access hole 3. In this step II the concentration, the temperature, the pressure and the flow amount of the drained test gas is determined during drainage. The test gas is removed so long until a sudden decrease of concentration of the test gas in the removed gas can be determined, which is a sign for the arrival of the barrier layer at the access hole. At the end in step III a mass balance is established. If the amount of test gas gained back correlates to the charged amount test gas, then the access hole 3 is tight.

Figure 3:
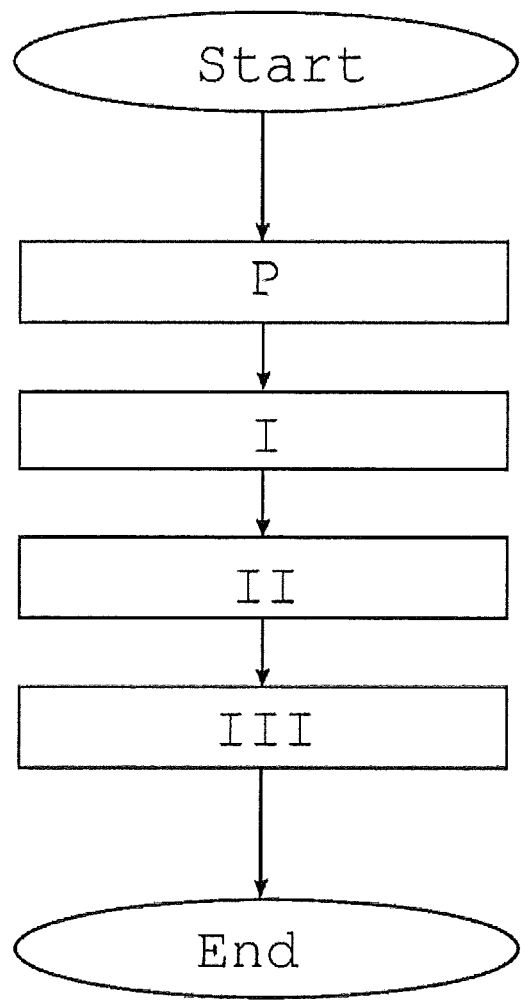
FIG. 3 shows a flow diagram of an embodiment of the method according to the invention.

In FIG. 3 finally an embodiment of the method according to the invention is illustrated, whereby a preparation step P is put in front of the steps according to FIG. 2. Here, a device for reducing the convection and diffusion flow between stored gas and test gas is inserted with the aid of an insertion device at the location, at which the barrier layer between test gas and stored gas is present during the resting phase.

In FIGS. 4A-4D a variant of a layer unit 6 of a device for reducing the convection and diffusion flow (convection barrier) according to the invention is illustrated in different views.

Layer unit 6 is hereby essentially circular cylindrical in order to be inserted into an access hole 3 of a cavity 4 the tightness, or more exactly the denseness thereof shall be examined although the cavity 4 is already filled with the stored gas. Hereby a damping of the admixture of stored gas and test gas caused by convection and diffusion is achieved via the layer unit 6. Thereby, the present geometry of the access hole 3 in the mixing zone is disturbed by means of the layer unit 6. The layer unit 6 exerts simultaneously, however, no influence on the fluidic property of the access hole 3.

The circular cylindrical layer unit 6 extends along a cylindrical access and comprises in its interior a layer package of multiple layers 63A, 63B of different porosity. Thus, between an upper side 60 and a lower side 61, multiple circular disk-like layers 63A of a material impermeable for the stored gas and for the test gas, for instance rubber, and layers 63B of a porous sponge-like material, for instance an aluminum foam, are arranged sandwich-like in a middle part 62 of the layer unit 6. Thereby circular disc-like layers 63A of non-porous material alternate with circular disc-like layers 63B of porous material along the cylindrical axis such that in each case two layers 63B of porous material are spatially separated from each other by a layer 63A of a non-porous material functioning as intermediate layer. Exemplarily, seven layers 63B of a porous sponge-like material are provided at present, which are separated by pairs of six layers 63A of a non-porous material. Two further layers 63A of non-porous material are additionally provided at the upper side 60 and the lower side 61 such that they can function as final layers and the seven porous layers 63B and the six non-porous layers 63A are arranged between them.

At present, the porous layers 63B have a thickness which is many times larger than the thickness of the relative flat non-porous layers 63A. Furthermore, the porous layers 63B are designed identical to each other, as well as the non-porous layers 63A are designed identical to each other. In general it would also be conceivable to choose for instance the thickness of the sponge-like porous layers 63B as being different to each other.

At present, the porous layer 63B have continuously a pore density of 10 to 30 ppi. The layer unit 6 has further a minimal diameter of about 60 mm and a minimal length of about 1.000 mm.

Figure 4A:
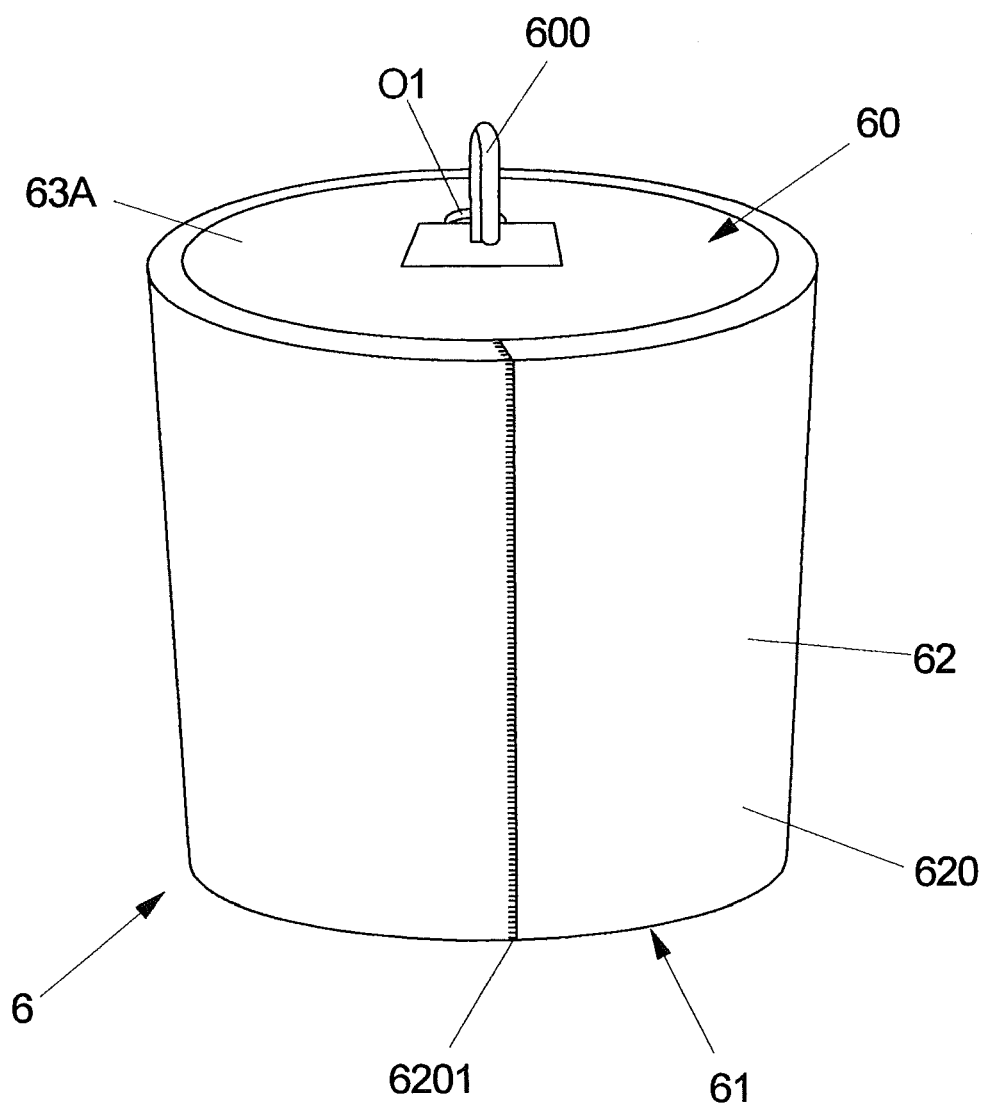
FIG. 4A shows a perspective view of a variant of a layer unit of a device according to the invention for reducing the convection and diffusion flow.
Figure 4B:
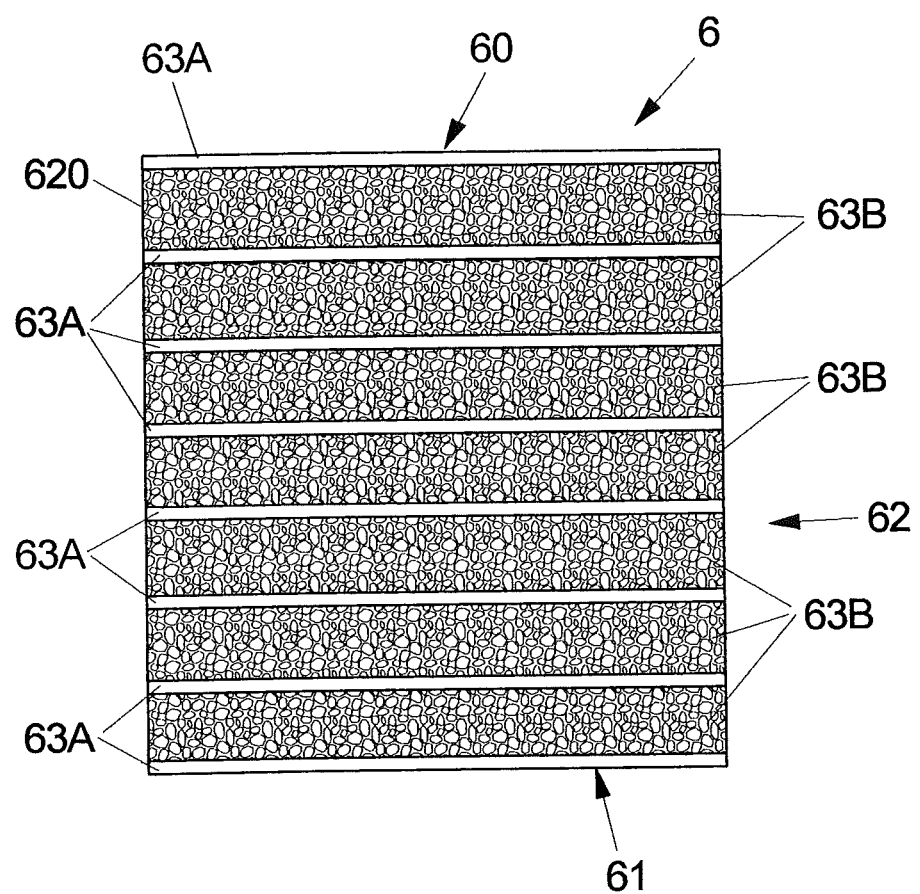
FIG. 4B shows a side view of the layer unit of FIG. 4A with removed jacket.
Figure 4C:
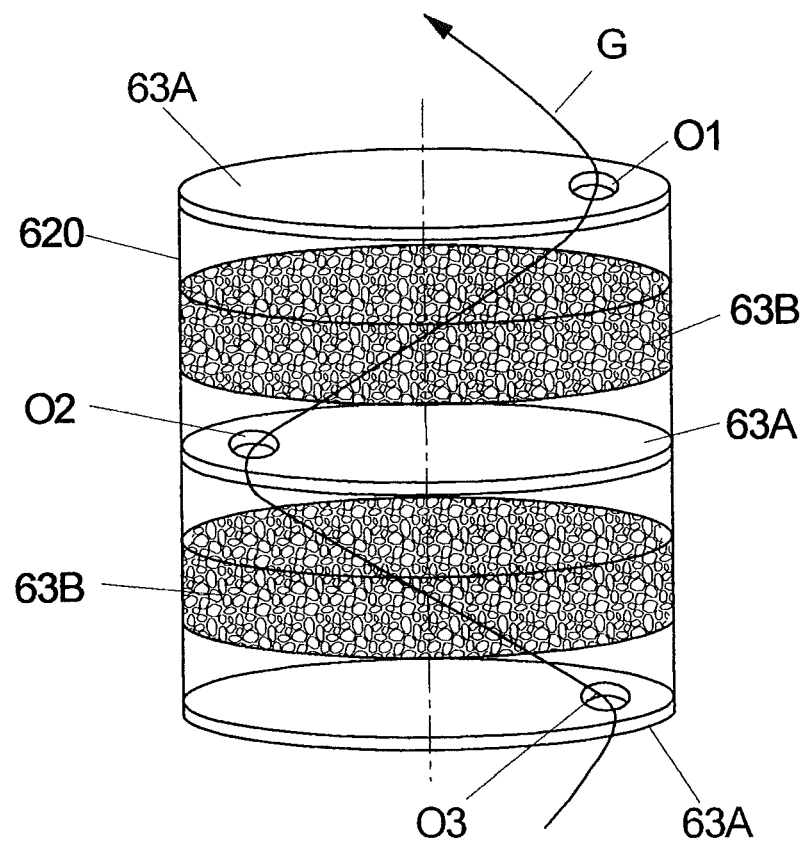
FIG. 4C shows a part of an exploded view of the layer unit of FIG. 4A.

As deducible from the explosion view of FIG. 4C, in which for simplification only five layers 63A, 63B are illustrated, each of the non-porous layers 63A has an opening O1, O2 or O3. Such an opening O1, O2, O3 is provided with a distance to the cylinder axis continuing centrally and is located here in the area of the radial edge of the respective layer 63A. The singular layers 63A are in each case distorted by 180° to the non-porous layer 63A following along the cylindrical axis. A gas flow G indicated exemplarily in FIG. 4C has thus to cover on its way through the layer unit 6 a path as long as possible through the porous layer 63B provided between the two non-porous layers 63A. The gas can thus not flow parallel to the cylindrical axis through two consecutive openings O1, O2 or O2, O3, but flows between these openings O1, O2 or O2, O3 also across to the cylindrical axis through a porous layer 63B. Hereby, the gas has to cover a longer path than in an open access hole 3 such that the convection and diffusion processes proceed temporarily slower when the convection barrier with the layer unit 6 is inserted.

In the layer unit 6, the layer package of the layers 63A and 63B is surrounded radially protectively by a flexible jacket 620. This jacket 620 is, for instance, made of a flexible plastic material and protects on the one hand the layers 63A, 63B from damage and contamination when inserting the layer unit 6 into the access hole 3. On the other hand, it is achieved via the flexibility of the jacket 620 that the layer unit 6 rests in a sealing manner against a (pipe) inner wall of the access hole 3 such that gas cannot flow between the inner wall and the jacket 620 passing the layer unit, but the gas has always to flow through the layers 63A and 63B.

Figure 4D:
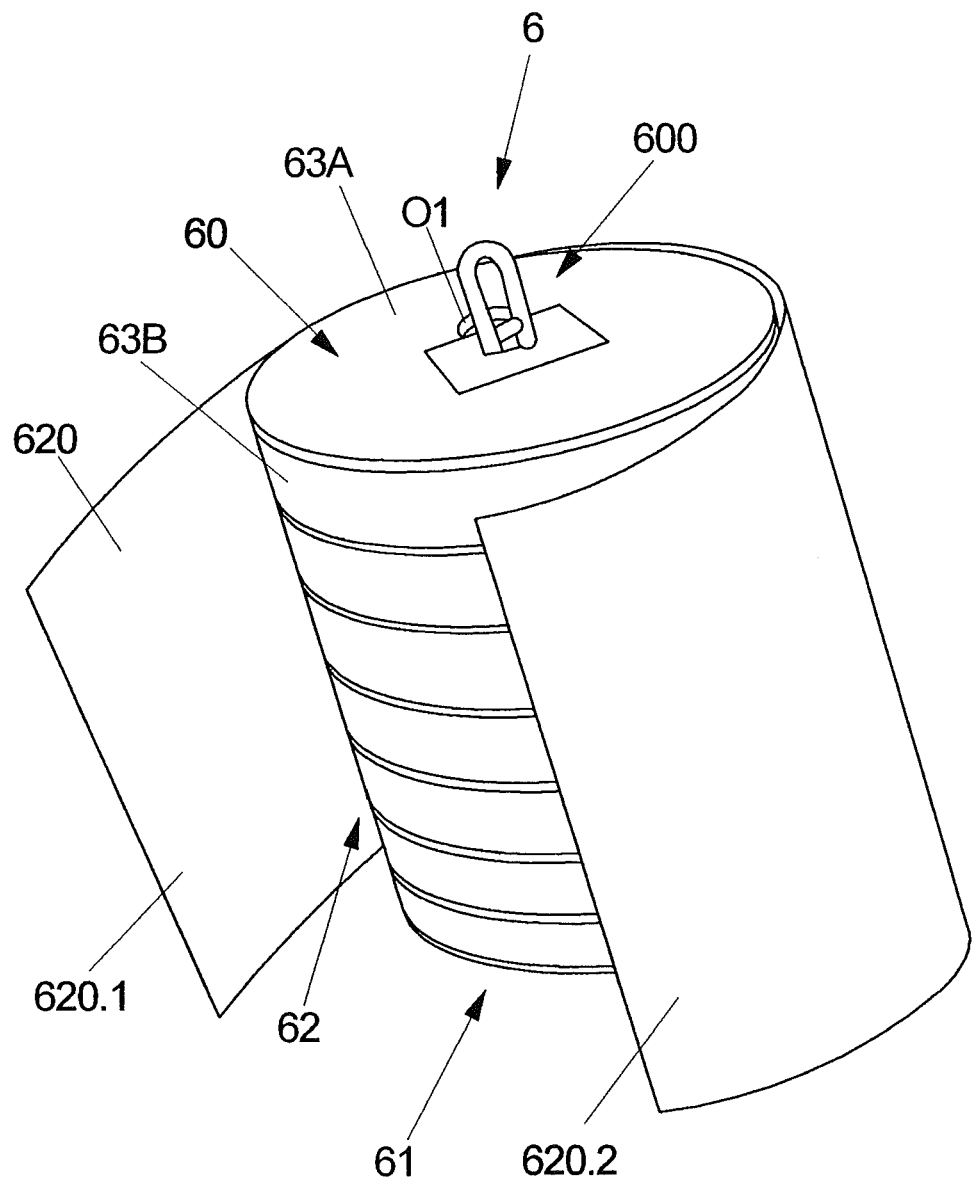
FIG. 4D shows a perspective view of the layer unit of FIG. 4A with partially removed jacket.

As in particular is illustrated in FIG. 4D, the jacket 620 can for instance be made by a flexible plastic panel which is wrapped once circulating about the layer package of the layers 63A and 63B. Free length ends 620.1 and 620.2 of the jacket 620 are then fixed to each other such that the jacket 620 surrounds protectively the layers 63A and 63B. A connection of the two ends 620.1 and 620.2 of the jacket 620 is illustrated in FIG. 4A by a joint continuing linear and parallel to the cylindrical axis. For fixing the jacket 620 to the layer package, the jacket 620 is additionally connected on the upper side 60 and the lower side 61 to the respective final layer 63A.

In order to attach the jacket 620 easily to the layer package formed by the layers 63A and 63B, the singular layers 63A and 63B are clamped between the upper side 60 and the lower side 61, for instance via a connecting rod continuing centrally along the cylindrical axis and passing through all layers 63A and 63B and by retaining plates provided at the end thereof at the lower side 61 and the upper side 60.

At an end of said connecting rod projecting from the upper side 60 an attaching means 600, here in form of a metal ring, is provided in the embodiment of FIGS. 4A to 4D. A connection to an insertion device (not illustrated) is possible via said attaching means 600, by means of which the layer unit 6 can be inserted directly below the hole base (pipe shoe) of the access hole 3.

LIST OF REFERENCE SIGNS 1 earth surface
2 access/removal point
3 access hole
4 cavity
5 barrier layer
6 layer unit
60 upper side
600 attaching means
61 lower side
62 middle part
620 jacket
620.1 first end
620.2 second end
6201 connecting point
63a first layer (rubber layer)
63b second layer (metal layer)
G gas flow
O1, O2, O3 opening

The invention claimed is:

1. A method for testing the tightness of cavities, which are already filled with a stored gas, by charging the cavity with a test gas, comprising:
  overlayering the stored gas situated in the cavity with a test gas of a predefined amount such that a barrier layer forms between the stored gas and the test gas, wherein the test gas has a lower density than the stored gas,
  releasing the test gas after a predefined time,
  determining the arrival of the barrier layer, which is moving when draining the test gas, at a removal point, and
  balancing the amount of test gas by comparing the amount of the released test gas with the predefined amount of test gas with which the stored gas had been overlaid.

2. A method for testing the tightness of cavities, which are already filled with a stored gas, by charging the cavity with a test gas, comprising:
  overlayering the stored gas situated in the cavity with a test gas of a predefined amount such that a barrier layer forms between the stored gas and the test gas, wherein the test gas has a lower density than the stored gas,
  releasing the test gas after a predefined time,
  balancing the amount of test gas by comparing the amount of the released test gas with the predefined amount of test gas with which the stored gas had been overlaid, and
  using a device reducing the convection and diffusion flow between stored gas and test gas.

3. The method according to claim 2, wherein the device reducing the convection and diffusion flow comprises a metallic sponge, which is inserted into the base of an access hole of the cavity before overlayering the stored gas.

4. The method according to claim 2, wherein the device reducing the convection and diffusion flow comprises an inflatable bellows with a sponge for avoiding a pressure drop between stored gas and test gas above the bellows, which is inserted into the base of an access hole of a cavity before overlaying the stored gas.

5. The method according to claim 2, wherein the device comprises a layer unit which is inserted into an access hole of the cavity and the layer unit comprises at least two layers of different porosity, which are successive along an extension axis.

6. A method for testing the tightness of cavities, which are already filled with a stored gas, by charging the cavity with a test gas, comprising:
  overlayering the stored gas situated in the cavity with a test gas of a predefined amount such that a barrier layer forms between the stored gas and the test gas, wherein the test gas has a lower density than the stored gas,
  releasing the test gas after a predefined time,
  controlling the placed amount of the test gas per time unit depending on the known volume profile of the cavity in the area of an access hole of the cavity and/or controlling a drained amount of the test gas per time unit depending on the known volume profile of the cavity in the area of an access hole of the cavity, and
  balancing the amount of test gas by comparing the amount of the released test gas with the predefined amount of test gas with which the stored gas had been overlaid.

* * * * *